US012101603B2

(12) United States Patent
Shin et al.

(10) Patent No.: US 12,101,603 B2
(45) Date of Patent: Sep. 24, 2024

(54) ELECTRONIC DEVICE INCLUDING INTEGRATED INERTIA SENSOR AND OPERATING METHOD THEREOF

(71) Applicant: SAMSUNG ELECTRONICS CO., LTD., Suwon-si (KR)

(72) Inventors: Sunghun Shin, Suwon-si (KR); Kihun Eom, Suwon-si (KR); Kihong Min, Suwon-si (KR); Hyeonyeong Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 172 days.

(21) Appl. No.: 17/828,694

(22) Filed: May 31, 2022

(65) Prior Publication Data

US 2022/0386046 A1 Dec. 1, 2022

Related U.S. Application Data

(63) Continuation of application No. PCT/KR2022/004418, filed on Mar. 29, 2022.

(30) Foreign Application Priority Data

May 31, 2021 (KR) ........................ 10-2021-0070380

(51) Int. Cl.
*H04R 25/00* (2006.01)

(52) U.S. Cl.
CPC ......... *H04R 25/606* (2013.01); *H04R 25/505* (2013.01)

(58) Field of Classification Search
CPC ............................ H04R 25/606; H04R 25/505
See application file for complete search history.

(56) References Cited

U.S. PATENT DOCUMENTS 10,512,750 B1 12/2019 Lewin Jessen et al.
10,535,364 B1 1/2020 Zhong et al.
(Continued)

FOREIGN PATENT DOCUMENTS

JP 2021-022757 2/2021
KR 10-2011-0105588 9/2011
(Continued)

OTHER PUBLICATIONS

Search Report and Written Opinion issued Jul. 7, 2022 in counterpart International Patent Application No. PCT/KR2022/004418.

*Primary Examiner* — Suhan Ni
(74) *Attorney, Agent, or Firm* — NIXON & VANDERHYE P.C.

(57) ABSTRACT

According to various embodiments, an electronic device may include: a housing configured to be mounted on or detached from an ear of a user, at least one processor disposed within the housing, an audio module including audio circuitry, and a sensor device including at least one sensor operatively coupled to the at least one processor and the audio module. The sensor device may be configured to: output acceleration-related data to the at least one processor through a first path of the sensor device, identify whether an utterance has been made during the output of the acceleration-related data; obtain bone conduction-related data based on the identification of the utterance; and output the obtained bone conduction-related data to the audio module through a second path of the sensor device.

18 Claims, 10 Drawing Sheets

(56) References Cited

U.S. PATENT DOCUMENTS

| | | | | |
|---|---|---|---|---|
| 10,972,844 | B1 | 4/2021 | Chiang et al. | |
| 2011/0029041 | A1* | 2/2011 | Wiskerke | A61N 1/36038 607/57 |
| 2013/0245362 | A1* | 9/2013 | Elofsson | H04R 25/606 600/25 |
| 2015/0245129 | A1 | 8/2015 | Dusan et al. | |
| 2017/0214786 | A1 | 7/2017 | Lee et al. | |
| 2017/0228995 | A1* | 8/2017 | Hosoi | H04R 25/00 |
| 2017/0263267 | A1 | 9/2017 | Dusan et al. | |
| 2018/0324518 | A1 | 11/2018 | Dusan et al. | |
| 2018/0361151 | A1* | 12/2018 | Ridler | A61N 1/025 |
| 2018/0367882 | A1 | 12/2018 | Watts et al. | |
| 2020/0288250 | A1 | 9/2020 | Ye | |
| 2021/0118461 | A1 | 4/2021 | Boeen et al. | |
| 2021/0125609 | A1 | 4/2021 | Dusan et al. | |

FOREIGN PATENT DOCUMENTS

| | | |
|---|---|---|
| KR | 10-2017-0089251 | 8/2017 |
| KR | 10-2020-0019954 | 2/2020 |
| WO | 2020/014371 | 1/2020 |

* cited by examiner

ELECTRONIC DEVICE INCLUDING INTEGRATED INERTIA SENSOR AND OPERATING METHOD THEREOF

CROSS-REFERENCE TO RELATED APPLICATIONS

This application is a continuation of International Application No. PCT/KR2022/004418 designating the United States, filed on Mar. 29, 2022, in the Korean Intellectual Property Receiving Office and claiming priority to Korean Patent Application No. 10-2021-0070380, filed on May 31, 2021, in the Korean Intellectual Property Office, the disclosures of which are incorporated by reference herein in their entireties.

BACKGROUND

Field

The disclosure relates to an electronic device including an integrated inertia sensor and an operating method thereof.

Description of Related Art

Portable electronic devices such as smartphones, tablet personal computers (PCs), and wearable devices are increasingly used. As a result, electronic devices wearable on users are under development to improve mobility and user accessibility. Examples of such electronic devices include an ear-wearable device (e.g., earphones) that may be worn on a user's ears. These electronic devices may be driven by a chargeable/dischargeable battery.

A wearable device (e.g., earphones) is an electronic device and/or an additional device which has a miniaturized speaker unit embedded therein and is worn on a user's ears (e.g., ear canals) to directly emit sound generated from a speaker unit into the user's ears, allowing the user to listen to sound with a little output.

The wearable device (e.g., earphones) requires input/output of a signal obtained by more precisely filtering an audio or voice signal which has been input or is to be output as well as portability and convenience. For example, when external noise around the user is mixed with the user's voice and then input, it is necessary to obtain an audio or voice signal by cancelling as much noise as possible. For this purpose, the wearable device (e.g., earphone) may include a bone conduction sensor and obtain a high-quality audio or voice signal using the bone conduction sensor.

In the wearable device (e.g., earphones), however, the bone conduction sensor is mounted together with another sensor, for example, a 6-axis sensor inside the wearable device (e.g., earphones) to provide acceleration data. Therefore, the adoption of the element may lead to the increase of an occupied area and an implementation price in the earphones whose miniaturization is sought. Further, since the earphones are worn on the user's ears, a battery having a small capacity is used due to the trend of miniaturization, and the operation of each sensor may increase battery consumption.

SUMMARY

Embodiments of the disclosure provide an electronic device including an integrated inertia sensor which increases the precision of an audio or voice signal, such as a bone conduction sensor, without adding a separate element, and an operating method thereof.

It will be appreciated by persons skilled in the art that the objects that could be achieved with the disclosure are not limited to what has been particularly described hereinabove and the above and other objects that the disclosure could achieve will be more clearly understood from the following detailed description.

According to various example embodiments, an electronic device may include: a housing configured to be mounted on or detached from an ear of a user, at least one processor disposed within the housing, an audio module including audio circuitry, and a sensor device including at least one sensor operatively coupled to the at least one processor and the audio module. The sensor device may be configured to: output acceleration-related data to the at least one processor through a first path of the sensor device, identify whether an utterance has been made during the output of the acceleration-related data, obtain bone conduction-related data based on the identification of the utterance, and output the obtained bone conduction-related data to the audio module through a second path of the sensor device.

According to various example embodiments, a method of operating an electronic device may include: outputting acceleration-related data to a processor of the electronic device through a first path of a sensor device of the electronic device, identifying whether an utterance has been made during the output of the acceleration-related data using the sensor device, obtaining bone conduction-related data based on the identification of the utterance using the sensor device, and outputting the obtained bone conduction-related data to an audio module of the electronic device through a second path of the sensor device.

According to various example embodiments, the precision of an audio or voice signal may be increased by performing the function of a bone conduction sensor using one sensor (e.g., a 6-axis sensor) without adding a separate element to a wearable device (e.g., earphones).

According to various example embodiments, the use of an integrated inertia sensor equipped with the functions of a 6-axis sensor and a bone conduction sensor in a wearable device (e.g., earphones) may increase sensor performance without increasing a mounting space and an implementation price, and mitigate battery consumption.

According to various example embodiments, the use of an integrated inertia sensor may lead to improvement of sound quality in a voice recognition function and a call function.

It will be appreciated by persons skilled in the art that that the effects that can be achieved through the disclosure are not limited to what has been particularly described hereinabove and other effects of the disclosure will be more clearly understood from the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to the description of the drawings, the same or similar reference numerals may denote the same or similar components.

DETAILED DESCRIPTION

Figure 1:
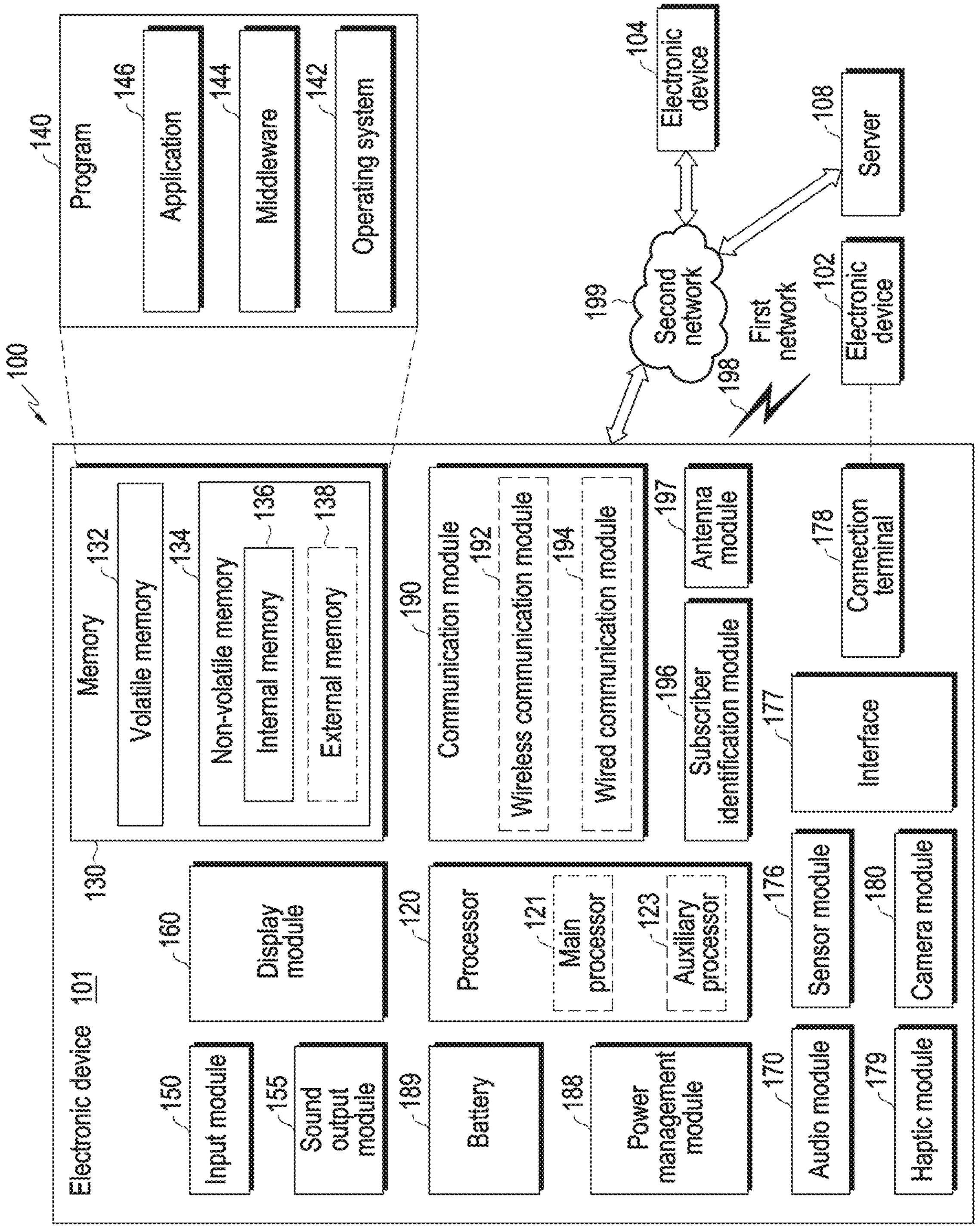
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
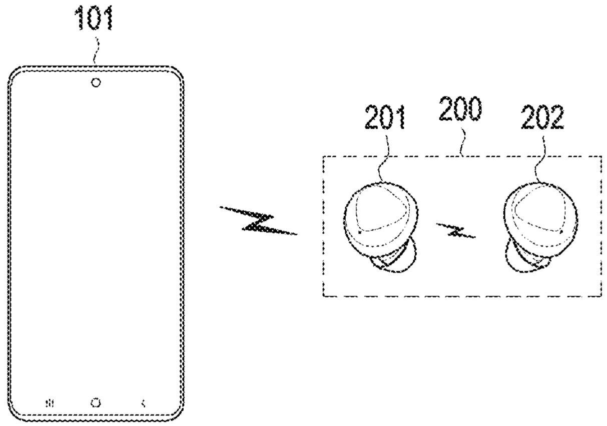
FIG. 2 is a diagram illustrating an example external accessory device interworking with an electronic device according to various embodiments.

FIG. 2 is a diagram illustrating an example of electronic devices (e.g., a user terminal (e.g., the electronic device 101) and a wearable device 200) according to various embodiments.

Referring to FIG. 2, the electronic devices may include the user terminal (e.g., the electronic device 101) and the wearable device 200. While the user terminal (e.g., the electronic device 101) may include a smartphone as illustrated in FIG. 2, the user terminal may be implemented as various kinds of devices (e.g., laptop computers including a standard laptop computer, an ultra-book, a netbook, and a tapbook, a tablet computer, a desktop computer, or the like), not limited to the description and/or the illustration. The user terminal (e.g., the electronic device 101) may be implemented as the electronic device 101 described before with reference to FIG. 1. Accordingly, the user terminal may include components (e.g., various modules) of the electronic device 101, and thus a redundant description may not be repeated here. Further, while the wearable device 200 may include wireless earphones as illustrated in FIG. 2, the wearable device 200 may be implemented as various types of devices (e.g., a smart watch, a head-mounted display device, or the like) which may be provided with a later-described integrated inertia sensor device, not limited to the description and/or the illustration. According to an embodiment, when the wearable device 200 is wireless earphones, the wearable device 200 may include a pair of devices (e.g., a first device 201 and a second device 202). The pair of devices (e.g., the first device 201 and the second device 202) may be configured to include the same components.

According to various embodiments, the user terminal (e.g., the electronic device 101) and the wearable device 200 may establish a communication connection with each other and transmit data to and/or receive data from each other. For example, while the user terminal (e.g., the electronic device 101) and the wearable device 200 may establish a communication connection with each other by device-to-device (D2D) communication (e.g., a communication circuit supporting the communication scheme) such as wireless fidelity (Wi-Fi) Direct or Bluetooth, the communication connection may be established in various other types of communication schemes (e.g., a communication scheme such as Wi-Fi using an access point (AP), a cellular communication scheme using a base station, and wired communication), not limited to D2D communication. When the wearable device 200 is wireless earphones, the user terminal (e.g., the electronic device 101) may establish a communication connection with only one device (e.g., a later-described master device) of the pair of devices (e.g., the first device 201 and the second device 202), which should not be construed as limiting. The user terminal (e.g., the electronic device 101) may establish communication connections with both (e.g., the later-described master device and a later-described slave device) of the devices (e.g., the first device 201 and the second device 202).

According to various embodiments, when the wearable device 200 is wireless earphones, a pair of devices (e.g., the first device 201 and the second device 202) may establish a communication connection with each other and transmit data to and/or receive data from each other. As described above, the communication connection may be established using D2D communication such as Wi-Fi Direct or Bluetooth (e.g., using a communication circuit supporting the communication scheme), which should not be construed as limiting.

In an embodiment, one of the two devices (e.g., the first device 201 and the second device 202) may serve as a primary device (or a main device), the other device may serve as a secondary device, and the primary device (or the main device) may transmit data to the secondary device. For example, when the pair of devices (e.g., the first device 201 and the second device 202) establish a communication connection with each other, one of the devices may be randomly selected as a primary device (or a main device) from the devices (e.g., the first device 201 and the second device 202), and the other device may be selected as a secondary device. In another example, when the pair of devices (e.g., the first device 201 and the second device 202) establish a communication connection with each other, a device which has been detected first as worn (e.g., a value indicating that the device has been worn is detected using a sensor sensing wearing (e.g., a proximity sensor, a touch sensor, and a 6-axis sensor) may be selected as a primary device (or a main device), and the other device may be selected as a secondary device. In an embodiment, the primary device (or the main device) may transmit data received from an external device (e.g., the user terminal (e.g., the electronic device 101)) to the secondary device. For example, the first device 201 serving as the primary device (or the main device) may output an audio to a speaker based on audio data received from the user terminal (e.g., the electronic device 101), and transmit the audio data to the second device 202 serving as the secondary device. In an embodiment, the primary device (or the main device) may transmit data received from the secondary device to the external device (e.g., a user terminal (e.g., the electronic device 101)). For example, when a touch event occurs in the secondary device, information about the generated touch event may be transmitted to the user terminal (e.g., the electronic device 101). However, the secondary device and the external device (e.g., the user terminal (e.g., the electronic device 101)) may establish a communication connection with each other as described above, and thus data transmission and/or reception may be directly performed between the secondary device and the external device (e.g., the electronic device 101), without being limited to the above description.

The wearable device 200 illustrated in FIG. 2 may also be referred to as earphones, ear pieces, ear buds, an audio device, or the like.

Figure 3:
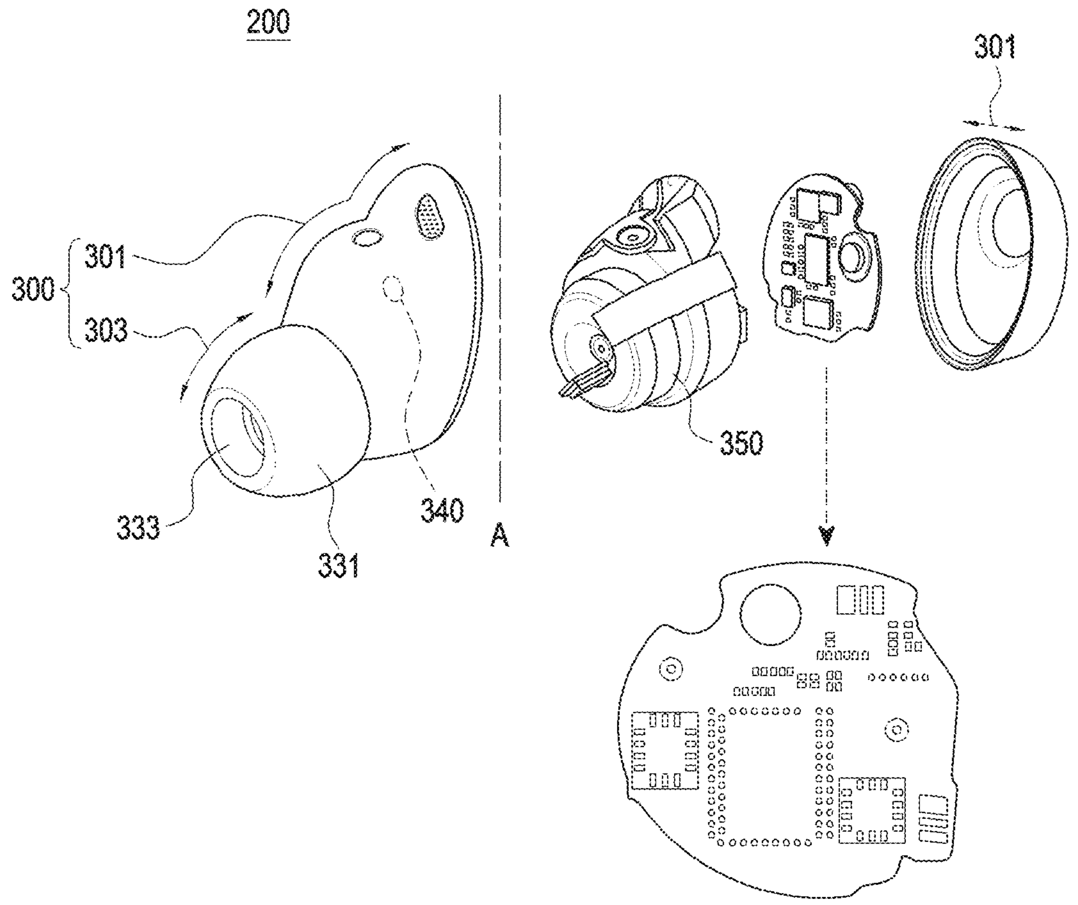
FIG. 3 is a diagram and an exploded perspective view illustrating an example wearable device according to various embodiments.

FIG. 3 is a diagram and an exploded perspective view illustrating an example of the wearable device 200 according to various embodiments.

Referring to FIG. 3, the wearable device 200 may include a housing (or a body) 300. The housing 300 may be configured to be mounted on or detachable from the user's ears. Without being limited to the description and/or the illustration, the wearable device 200 may further include devices (e.g., a moving member to be coupled with an earwheel) which may be disposed on the housing 300.

According to various embodiments, the housing 300 of the wearable device 200 may include a first part 301 and a second part 303. When worn by the user, the first part 301 may be implemented (and/or designed) to have a physical shape seated in the groove of the user's earwheel, and the second part 303 may be implemented (and/or designed) to have a physical shape inserted into an ear canal of the user. The first part 301 may be implemented to include a surface having a predetermined (e.g., specified) curvature as a body part of the housing 300, and the second part 303 may be shaped into a cylinder protruding from the first part 301. A hole may be formed in a partial area of the first part 301, and a wear detection sensor 340 (e.g., a proximity sensor) may be provided below the hole. As illustrated in FIG. 3, the second part 303 may further include a member 331 (e.g., an ear tip) made of a material having high friction (e.g., rubber) in a substantially circular shape. The member 331 may be detachable from the second part 303. A speaker 350 may be provided in an internal space of the housing 300 of the wearable device 200, and an audio output through the speaker 350 may be emitted to the outside through an opening 333 formed in the second part 303.

According to a comparative example, a wearable device may include a substrate on which various circuits are arranged in an internal space of a housing. For example, when a bone conduction sensor is disposed on the substrate in addition to a 6-axis sensor, the mounting space may be very small, thereby making it difficult to select a position that maximizes the performance of each sensor. For example, although the mounting position of the 6-axis sensor on the substrate may not be a big consideration, the bone conduction sensor should be placed close to a contact part inside the user's ear when the wearable device is worn, to monitor vibration caused by the user during speaking. However, the mounting space for the bone conduction sensor may be insufficient.

Moreover, since the bone conduction sensor processes high-speed data, it may suffer from high current consumption in an always-on state and thus may be set to a default-off state. Therefore, the bone conduction sensor may be switched from the off state to the on state, as needed, and may be unstable in data acquisition until the transition to the on state is completed. This will be described with reference to FIG. 4.

Figure 4:
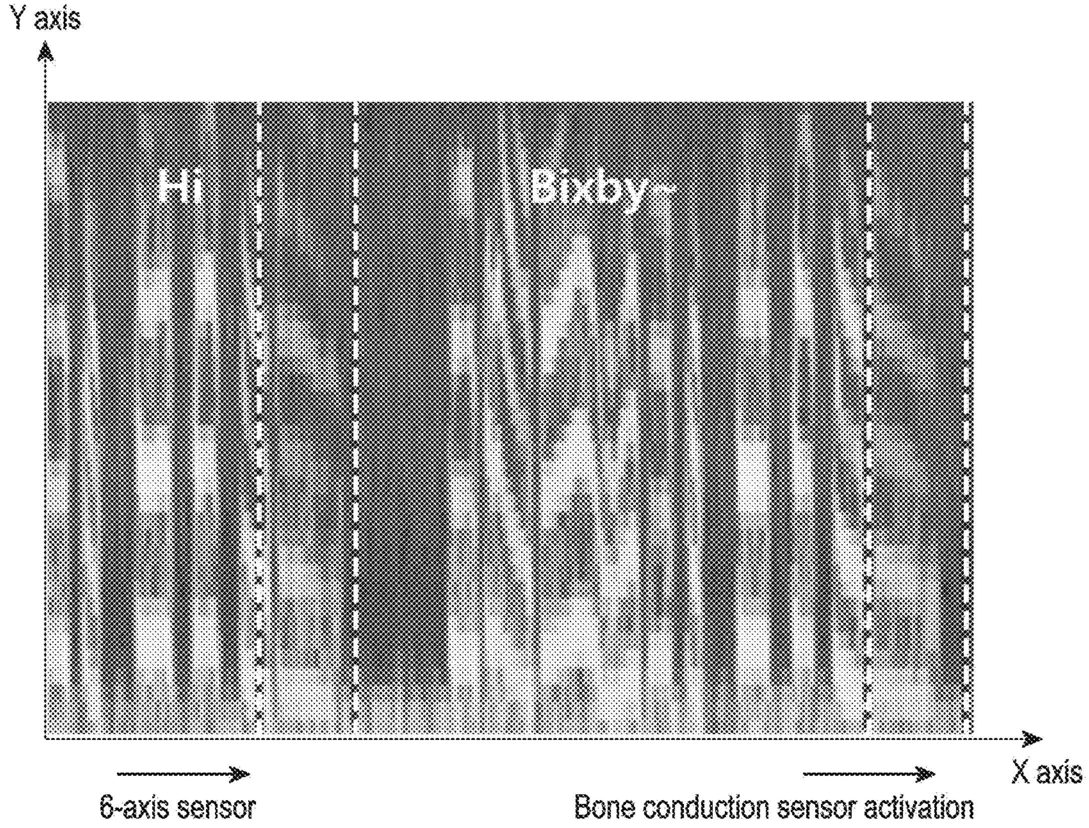
FIG. 4 is a diagram illustrating an initial data acquisition process using a bone conduction sensor according to various embodiments.

FIG. 4 is a diagram illustrating an example initial data acquisition process using a bone conduction sensor according to various embodiments.

FIG. 4 illustrates the waveform and spectrum of an audio signal. In FIG. 4, the X axis represents time, and the Y axis represents the size of the waveform of a collected signal, in a graph. For example, when the user says "Hi Bixby~", a changed state corresponding to the "Hi" part may be detected by the 6-axis sensor. For example, as illustrated in FIG. 4, since a spectral change occurs to an audio signal due to the user's utterance, the start of the utterance may be identified by the 6-axis sensor. Accordingly, the 6-axis sensor may transmit a request for switching the bone conduction sensor to the on state to a processor (e.g., a sensor hub), and the processor forwards the request to an audio module (e.g., a codec). When the bone conduction sensor is activated through the codec, an audio signal corresponding to the "Bixby~" part may be collected. However, since the bone conduction sensor is activated by the request signal transmitted in the order of the 6-axis sensor→processor→codec→bone conduction sensor as described above, the bone conduction sensor may not be able to collect initial data, for example, data corresponding to the "Bix" part or its following part before the request signal is transmitted to the bone conduction sensor. For example, when voice recognition is required, the loss of the initial data may lead to a decreased voice recognition rate.

Therefore, when the function of the bone conduction sensor is controlled to be activated immediately, the precision of an audio or voice signal may be increased without loss of initial data. Further, according to various embodiments, the function of the bone conduction sensor may be executed using one sensor (e.g., the 6-axis sensor) to increase sensor performance without increasing the mounting space and the implementation price of the wearable device (e.g., earphones). Accordingly, the sound quality of a voice recognition function and a call function may be increased.

While for convenience of description, the wearable device 200 is described below in the context of the wearable device 200 being wireless earphones, and one of a pair of devices (e.g., the first device 201 and the second device 202 of FIG. 2) being taken as an example, the following description may also be applied to the other of the pair of devices (e.g., the first device 201 and the second device 202). The following description may also be applied to various types of wearable devices 200 (e.g., a smart watch and a head-mounted display device) including one sensor device (e.g., a 6-axis sensor) in which the function of the bone conduction sensor is integrated, as described above.

Figure 5:
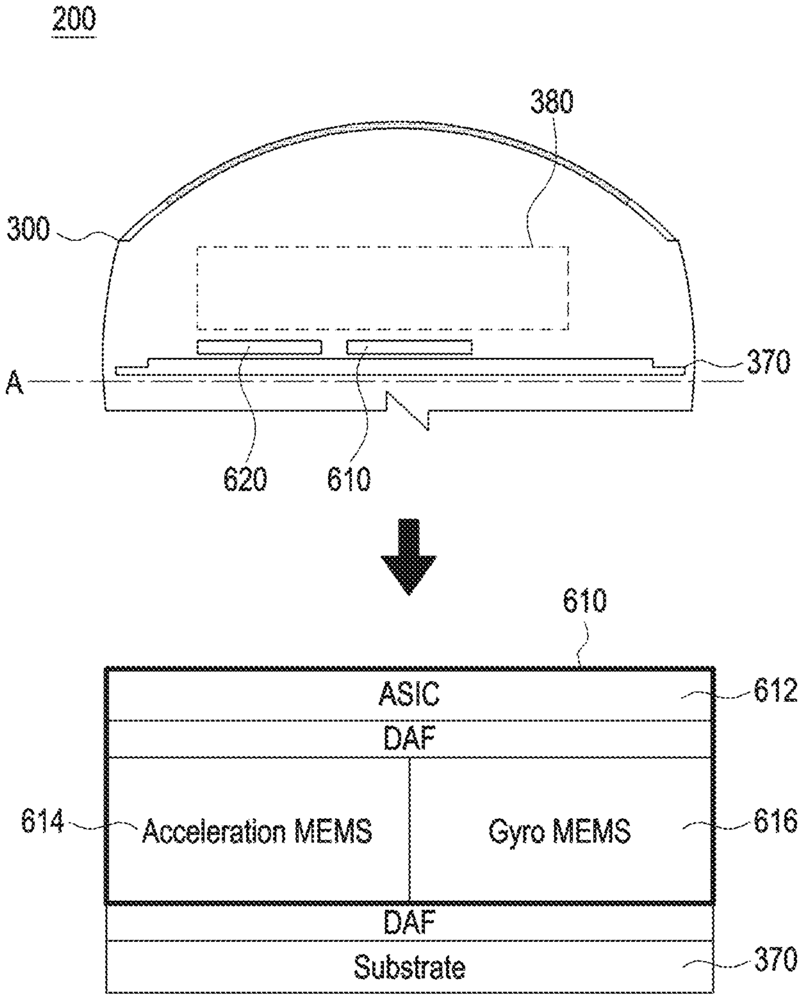
FIG. 5 is a diagram illustrating an example internal space of a wearable device according to various embodiments.

FIG. 5 is a diagram illustrating an example of an internal space of a wearable device according to various embodiments.

According to various embodiments, the housing 300 of the wearable device 200 may be configured as illustrated in FIG. 3, and FIG. 5 is a diagram illustrating an example internal space, when a cross-section of the wearable device 200 of FIG. 3 is taken along line A.

According to various embodiments, the wearable device 200 may include the housing (or body) 300 as illustrated in FIG. 5. The housing 300 may include, for example, a part detachably mounted on an ear of the user, and may be provided with a speaker (not shown), a battery (not shown), a wireless communication circuit (not shown), a sensor device (e.g., sensor) 610, and/or a processor 620 in its internal space. Further, since the wearable device 200 may further include the components described before with reference to FIG. 3, a redundant description may not be repeated here. In addition, according to various embodiments, the wearable device 200 may further include various modules according to its providing type. Although too many modifications to be listed herein may be made along with the trend of convergence of digital devices, components equivalent to the above-described components may be further included in the wearable device 200. Further, it will be apparent that specific components may be excluded from the above-described components or replaced with other components according to the providing type of the wearable device 200 according to an embodiment, which could be easily understood by those skilled in the art.

Referring to FIG. 5, various devices and/or components 380 may be arranged between an inner wall of the housing 300 and a substrate 370, and circuit devices such as the processor 620 and the sensor device 610 may be disposed on the substrate 370. Without being limited to the illustration, a plurality of substrates 370 on which the processor 620 and the second device 610 are disposed, respectively, may be arranged inside the housing 300. The circuit devices arranged on the substrate 370 may be electrically coupled to each other, and transmit data to and/or receive from each other. The processor 620 and the sensor device 610 will further be described in greater detail below with reference to FIG. 6A.

An example of the sensor device 610 disposed on the substrate 370 will be described in greater detail. The sensor device 610 may be disposed on the substrate 370 using a die attach film (DAF). The DAF may be used for bonding between semiconductor chips as well as for bonding of the sensor device 610 to the substrate 370.

The sensor device 610 according to various embodiments may, for example, be a 6-axis sensor including an acceleration sensor and a gyro sensor. The acceleration sensor may measure an acceleration based on an acceleration microelectromechanical system (MEMS) 614, and the gyro sensor may measure an angular speed based on a gyro MEMS 616. For example, the acceleration sensor may output a signal (or data) indicating physical characteristics based on a change in capacitance.

The sensor device 610 according to various embodiments may be a 6-axis sensor and include an acceleration sensor and a gyro sensor (or an angular speed sensor). Because the sensors included in the 6-axis sensor may be implemented and operated as known (e.g., the acceleration sensor generates an electrical signal representing an acceleration value for each axis (e.g., the x axis, y axis, and z axis), and the gyro sensor generates an electrical signal representing an angular speed value for each axis), the sensors will not be described in detail.

According to various embodiments, the sensor device 610 may be implemented to include the function of a bone conduction sensor in addition to the function of the 6-axis sensor. An operation of obtaining a signal (or data) representing data characteristics related to bone conduction by means of a 6-axis sensor will be described in greater detail below with reference to FIGS. 6A and 6B.

The sensor device 610 according to various embodiments may obtain sampled data through an analog-to-digital (A/D) converter (not shown). According to various embodiments, the sensor device 610 may include an application-specific integrated circuit (ASIC) 612 as illustrated in FIG. 5. According to an embodiment, the ASIC 612 may be referred to as a processor (e.g., a first processor) in the sensor device 610, and the processor 620 interworking with the sensor device 610 may be referred to as a second processor. For example, although the processor 620 may be a supplementary processor (SP) (e.g., a sensor hub) for collecting and processing sensor data from the sensor device 610 at all times, the processor 620 may also be a main processor such as a central processing unit (CPU) and an AP.

Therefore, the first processor (e.g., the ASIC 612) may convert a signal obtained by the acceleration MEMS 614 and/or the gyro MEMS 616 into digital data using the A/D converter. For example, the sensor device 610 may obtain digital data (or digital values) by sampling a signal received through the acceleration MEMS 614 and/or the gyro MEMS 616 at a specific sampling rate. When bone conduction-related data is required, for example, upon detection of an utterance, the first processor (e.g., the ASIC 612) of the sensor device 610 may obtain digital data by sampling a signal received through the acceleration MEMS 614 and/or the gyro MEMS 616 at a sampling rate different from the above sampling rate.

A detailed description will be given of operations of the sensor device 610 and the processor 620 with reference to FIGS. 6A and 6B. For example, an example of an operation of performing the function of a bone conduction sensor using one sensor device (e.g., a 6-axis sensor) will be described.

Figure 6A:
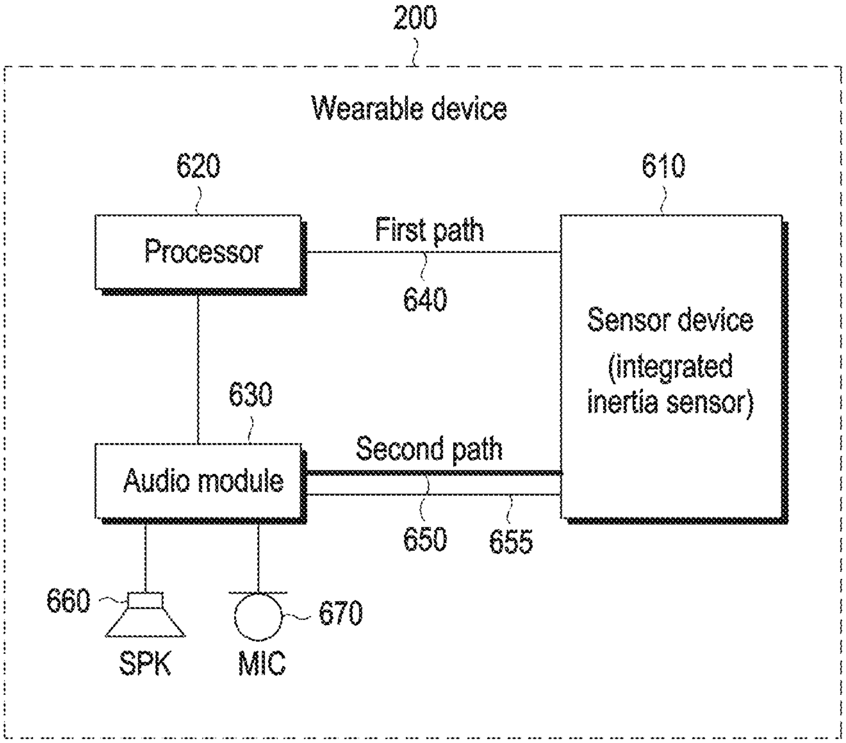
FIG. 6A is a block diagram illustrating an example configuration of a wearable device according to various embodiments.
Figure 6B:
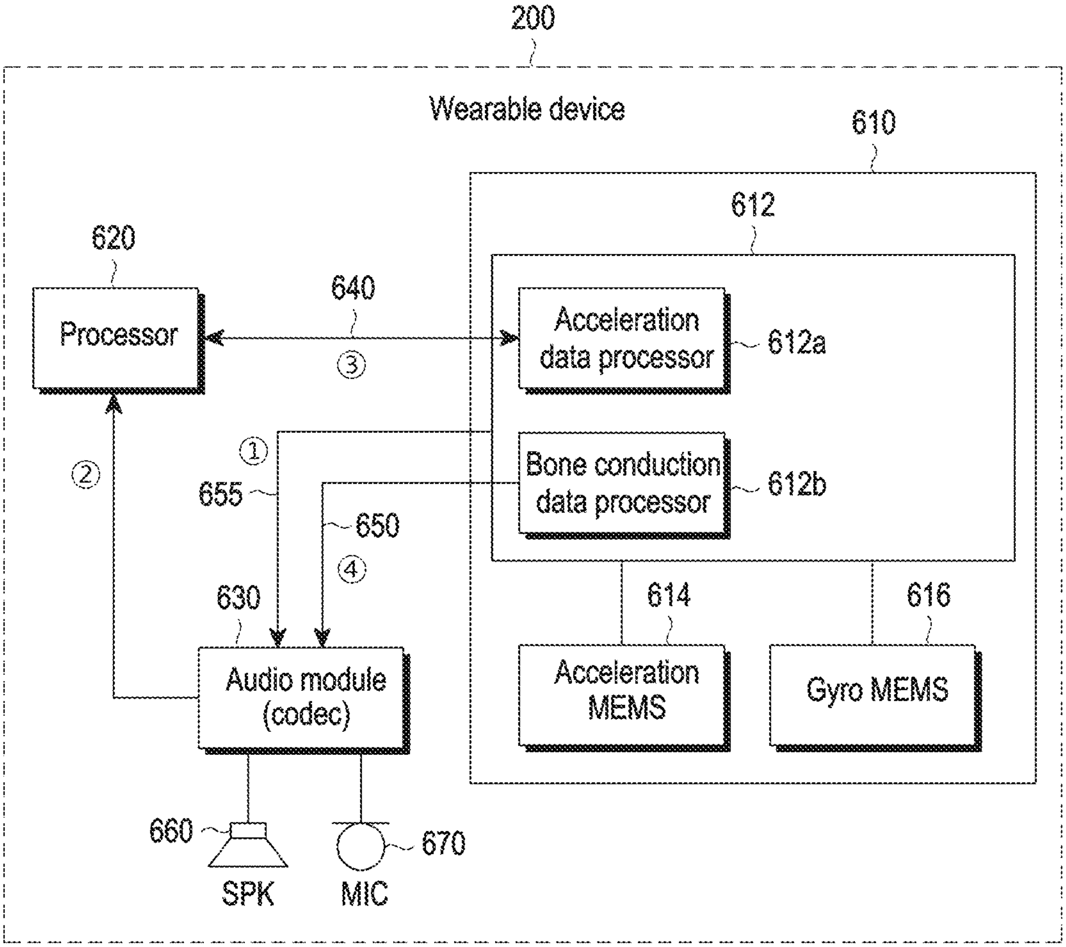
FIG. 6B is a block diagram illustrating an example configuration of a wearable device according to various embodiments.

FIG. 6A is a block diagram illustrating an example configuration of a wearable device according to various embodiments, and FIG. 6B is a block diagram illustrating an example configuration of the wearable device according to various embodiments.

Referring to FIG. 6A, the wearable device 200 according to various embodiments may include the sensor device (e.g., including a sensor) 610, the processor (e.g., including processing circuitry) 620, an audio module (e.g., including audio circuitry) 630, and a speaker 660 and a microphone 670 coupled to the audio module 630.

The sensor device 610 according to various embodiments may be a 6-axis sensor and provide data related to bone conduction, like a bone conduction sensor, while operating as a 6-axis sensor without addition of a separate element. The sensor device 610 according to various embodiments may be implemented as a sensor module, and may be an integrated sensor in which an acceleration sensor and a gyro sensor are incorporated. An acceleration MEMS (e.g., the acceleration MEMS 614 of FIG. 5) and an ASIC (e.g., the ASIC 612 of FIG. 5) may be collectively referred to as an acceleration sensor, and a gyro MEMS (e.g., the gyro MEMS 616 of FIG. 5) and an ASIC (e.g., the ASIC 612 of FIG. 5) may be collectively referred to as a gyro sensor.

According to various embodiments, the sensor device 610 may perform the function of a bone conduction sensor as well as the function of an acceleration sensor and the function of a gyro sensor. Accordingly, the sensor device 610 may be referred to as an integrated inertia sensor.

As illustrated in FIG. 6A, the sensor device 610 may be coupled to the processor 620 through a first path 640 and to the audio module 630 through a second path 650. According to various embodiments, the sensor device 610 may communicate with the processor 620 based on at least one protocol among for example, and without limitation, an inter-integrated circuit (I2C) protocol, serial peripheral interface (SPI) protocol, I3C protocol, or the like, through the first path 640. For example, the first path may be referred to as a communication line or an interface between the sensor device 610 and the processor 620.

According to various embodiments, the sensor device 610 may transmit and receive various control signals to and from the processor 620 through the first path 640, transmit data to the audio module 630 through the second path 650, and transmit a control signal to the audio module 630 through a path 655 different from the second path 650. For example, a communication scheme through the first path 640 and a communication scheme through the other path 655 may be performed based, for example, and without limitation, on at least one of I2C, SPI, I3C, or the like, protocols, and may be performed based on the same protocol or different protocols. In addition, the communication scheme through the second path 650 may be a method of transmitting a large amount of data within the same time period, and may be different from the communication scheme through the first path 650 and/or the other path 655. For example, when the first path 640 and the other path 655 are referred to as control signal lines, the second path 650 may be referred to as a high-speed data communication line.

While the path 655 for transmitting and receiving a control signal between the sensor device 610 and the audio module 630 and the path 650 for transmitting data between the sensor device 610 and the audio module 630 are shown as different paths in FIG. 6A, when the paths 650 and 655 are based on a protocol supporting both of control signal transmission and reception and data transmission, the paths 650 and 655 may be integrated into one path.

According to various embodiments, the sensor device 610 may communicate with the audio module 630 in, for example, time division multiplexing (TDM) through the second path 650.

According to various embodiments, the sensor device 610 may transmit data from the sensors (e.g., the acceleration sensor and the gyro sensor) to the processor 620 based, for example, and without limitation, on any one of the I2C, SPI, I3C, or the like, protocols.

According to various embodiments, the sensor device 610 may transmit data collected during activation of the bone conduction function to the audio module 630 through the second path 650. While it has been described that the sensor device 610 transmits data in TDM to the audio module 630 through the second path 650 by way of example according to a non-limiting embodiment, the data transmission scheme may not be limited to TDM. For example, TDM is a method of configuring multiple virtual paths in one transmission path by time division and transmitting a large amount of data in the multiple virtual paths. Other examples of the data transmission scheme include, for example, and without limitation, wavelength division multiplexing (WDM), frequency division multiplexing (FDM), or the like, and as far as a large amount of data are transmitted from the sensor device 610 to the audio module 630 within the same time period, any data transmission scheme is available.

According to various embodiments, the audio module 630 may process, for example, a signal input or output through the speaker 660 or the microphone 670. The audio module 630 may include various audio circuitry including, for example, a codec. The audio module 630 may filter or tune sensor data corresponding to an audio or voice signal received from the sensor device 610. Accordingly, fine vibration information transmitted through bone vibration when the user speaks may be detected.

According to various embodiments, when the wearable device 200 is booted, the processor 620 may control the sensor device 610 according to a stored set value. For example, the bone conduction function of the sensor device 610 may be set to a default off state or a setting value such as a sampling rate corresponding to a period T in which the sensor device 610 is controlled may be pre-stored.

According to various embodiments, when a specified condition is satisfied, the processor 620 may activate the bone conduction function of the sensor device 610. According to an embodiment, the specified condition may include at least one of detection of wearing of the wearable device 200 or execution of a specified application or function. For example, the specified application or function corresponds to a case in which noise needs to be canceled in an audio or voice signal, and when an application or function requiring increased voice recognition performance such as a call application or a voice assistant function is executed, the bone conduction function may be activated to obtain bone conduction-related data.

For example, when detecting that the user wears the wearable device 200 using a sensor (e.g., a proximity sensor, a 6-axis sensor) for detecting whether the wearable device 200 is worn, the wearable device 200 may identify that the specified condition is satisfied. In addition, upon receipt of a user input for executing a specified application such as a call application or a voice assistant function, the wearable device 200 may identify that the specified condition is satisfied.

According to various embodiments, when the audio module 630 does not require data related to an audio signal (e.g., bone conduction), the processor 620 may deactivate the bone conduction function of the sensor device 610. According to an embodiment, when a specified termination condition is satisfied, the processor 620 may deactivate the bone conduction function. According to an embodiment, the specified termination condition may include at least one of detection of removal of the wearable device 200 or termination of the specified application or function.

The active state of the bone conduction function may refer, for example, to a state in which the sensor device 610 outputs data related to bone conduction at a specified sampling rate. For example, while the sensor device 610 outputs data related to an acceleration at a first sampling rate, the sensor device 610 may output data related to bone conduction at a second sampling rate. On the contrary, the inactive state of the bone conduction function may refer, for example, to a state in which data related to bone conduction is not output. According to an embodiment, the processor 620 may activate or deactivate individual sensor functions included in the sensor device 610.

With reference to FIG. 6B, an example of an operation related to activation or deactivation of the bone conduction function of the sensor device 610 will be described in greater detail below.

Referring to FIG. 6B, the sensor device 610 according to various embodiments may be a 6-axis sensor in which a 3-axis acceleration sensor and a 3-axis gyro (or angular velocity) sensor are combined. The 3-axis acceleration sensor may be a combination of the acceleration MEMS 614 being a kind of interface and the ASIC 612. Likewise, a combination of the gyro MEMS 616 and the ASIC 612 may be the 3-axis gyro sensor.

The sensor device 610 according to various embodiments may measure a gravity acceleration using the acceleration sensor being sub-sensors, and a variation of an angular velocity using the gyro sensor. For example, the acceleration MEMS 614 and/or the gyro MEMS 616 may generate an electrical signal, as a capacitance value is changed by vibration of a weight provided on an axis basis.

According to various embodiments, the electrical signal generated by the acceleration MEMS 614 and/or the gyro MEMS 616 may be converted into digital data by an A/D converter coupled to an input terminal of an acceleration data processor 612*a*. According to an embodiment, digital data collected by the acceleration data processor 612*a* may be referred to as acceleration-related data. The acceleration data processor 612*a* may be configured in the form of an ASIC.

When the bone conduction function is activated, an electrical signal generated by the acceleration MEMS 614 and/or gyro MEMS 616 may be converted into digital data by an A/D converter coupled to an input terminal of a bone conduction data processor 612*b*. As described above, the acceleration data processor 612*a* and the bone conduction data processor 612*b* may be coupled to different A/D converters. According to an embodiment, digital data collected by the bone conduction data processor 612*b* may be referred to as bone conduction-related data.

As illustrated in FIG. 6B, the ASIC 612 may largely include an acceleration data processor 612*a* for collecting acceleration-related data and the bone conduction data processor 612*b* for collecting bone conduction-related data, and may be referred to as a processor (e.g., a first processor) within the sensor device 610. According to an embodiment, the acceleration data processor 612*a* and the bone conduction data processor 612*b* may have different full scale ranges (or processing capabilities). For example, the acceleration data processor 612*a* may detect data corresponding to 8G, whereas the bone conduction data processor 612*b* may detect data corresponding to 3.7G. Therefore, on the assumption that the same data is sampled, the bone conduction data processor 612*b* may obtain data in a detailed range, compared to a processing unit in the acceleration data processor 612*a*, because the bone conduction data processor 612*b* has a narrow range.

The sensors (e.g., the acceleration sensors and the gyro sensor) of the sensor device 610 detect an utterance of the user according to a movement that the user makes during the utterance. When the user wearing the wearable device 200 speaks, the bone conduction function also serves to detect minute tremors. As described above, the function of the bone conduction sensor and the function of the acceleration sensor may rely on similar detection principles principle and may have different sampling rates. For example, since the audio module 630 requires data of a high sampling rate to improve the sound quality of an audio or voice signal, the bone conduction-related data used to improve the sound quality of the audio or voice signal may be data sampled at the high sampling rate, compared to the sampling rate of the acceleration-related data.

According to various embodiments, the sensor device 610 may detect an utterance using a voice activity detection (VAD) function. For example, the sensor device 610 may detect an utterance according to the characteristics (or pattern) of an electrical signal generated from the acceleration sensor and/or the gyro sensor using the VAD function.

According to various embodiments, upon detection of the start of the utterance, the sensor device 610 may transmit an interrupt signal ① to the audio module 630 through the path (or interface) 655 leading to the audio module 630. In response to the interrupt signal, the audio module 630 may transmit a signal ② requesting the processor 620 to activate the bone conduction function of the sensor device 610 through a specified path between the audio module 630 and the processor 620. According to an embodiment, the sensor device 610 may communicate with the audio module 630 based on at least one of the I2C, SPI, or I3C protocols through the path (or interface) 655. In this case, the audio module 630 and the processor 620 may also communicate through the specified path based on the protocol.

According to various embodiments, in response to the request signal ② from the audio module 630, the processor 620 may transmit a signal ③ for activating the bone conduction function of the sensor device 610 through the first path 640 leading to the sensor device 610. In response to the reception of the signal ③ for activating the bone conduction function, the sensor device 610 may activate the bone conduction function, for example, collect digital data ④ sampled at a specific sampling rate through the bone conduction data processor 612*b* and continuously transmit the digital data ④ through the second path 650 leading to the audio module 630. According to an embodiment, the sensor device 610 may transmit the collected data to the audio module 630 through the second path 650 different from the path 655 for transmitting an interrupt signal. For example, the path 655 for transmitting the interrupt signal between the sensor device 610 and the audio module 630 may be a path for communication based on a specified protocol, and the second path 650 for transmitting the collected data may be a TDM-based path.

According to various embodiments, sampling data periodically obtained at the first sampling rate may be acceleration-related data. On the other hand, sampling data obtained at the second sampling rate may be bone conduction-related data. Accordingly, the sensor device 610 may collect the bone conduction-related data sampled at the second sampling rate, simultaneously with the collection of the acceleration sampled at the first sampling rate. The acceleration-related data may always be transmitted to the processor 620 through the first path 640 of the processor 620, and the bone conduction-related data may be transmitted to the audio module 630 through the second path 650 leading to the audio module 630 only during activation of the bone conduction function.

According to various embodiments, the audio module 630 may obtain utterance characteristics through tuning using received digital data, that is, the bone conduction-related and audio data collected through the microphone 670. Accordingly, the audio module 630 may improve the sound quality of an audio or voice signal by canceling noise based on the utterance characteristics.

The bone conduction function of the sensor device 610 may be deactivated, when needed. According to an embodiment, when a specified termination condition is satisfied, the processor 620 may deactivate the bone conduction function. According to an embodiment, the specified termination condition may include at least one of detection of removal of the wearable device 200 or termination of a specified application or function. Further, when it is determined that the user has not made an utterance during a predetermined time or more using the VAD function, the bone conduction function may be deactivated.

For example, even when execution of an application (e.g., a call application or a voice assistant function) related to the utterance characteristics is terminated, the processor 620 may transmit a signal for deactivating the bone conduction function of the sensor device 610 through the first path 640 leading to the sensor device 610. In addition, the bone conduction function may be deactivated by discontinuing transmission of a clock control signal transmitted from the audio module 630 through the second path 650 to the sensor device 610.

According to various example embodiments, an electronic device (e.g., 200 in FIG. 6B) may include: a housing configured to be mounted on or detached from an ear of a user, at least one processor (e.g., 620 in FIG. 6B) located in the housing, an audio module (e.g., 630 in FIG. 6B) including audio circuitry, and a sensor device (e.g., 610 in FIG. 6B) including at least one sensor operatively coupled to the at least one processor and the audio module. The sensor device may be configured to output acceleration-related data to the at least one processor through a first path (e.g., 640 in FIG. 6B) of the sensor device, identify whether an utterance has been made during the output of the acceleration-related data, obtain bone conduction-related data based on the identification of the utterance, and output the obtained bone conduction-related data to the audio module through a second path (e.g., 650 in FIG. 6B) of the sensor device.

According to various example embodiments, the sensor device may be configured to output the acceleration-related data to the at least one processor through the first path based on at least one of I2C, serial peripheral interface (SPI), or I3C protocols, and the sensor device may be configured to output the obtained bone conduction-related data based on time division multiplexing (TDM) scheme to the audio module through the second path.

According to various example embodiments, the sensor device may be configured to obtain the acceleration-related data at a first sampling rate, and obtain the bone conduction-related data at a second sampling rate, based on the identification of the utterance.

According to various example embodiments, the sensor device may be configured to convert the bone conduction-related data obtained at the second sampling rate through an A/D converter and output the converted bone conduction-related data to the audio module through the second path.

According to various example embodiments, the sensor device may be configured to receive a first signal for activating a bone conduction function from the at least one processor based on the identification of the utterance, and obtain the bone conduction-related data in response to the reception of the first signal.

According to various example embodiments, the sensor device may be configured to output a second signal related to the identification of the utterance to the audio module based on the identification of the utterance.

According to various example embodiments, the at least one processor may be configured to: receive a third signal requesting activation of the bone conduction function of the sensor device from the audio module in response to the output of the second signal related to the identification of the utterance to the audio module, and output the first signal for activation of the bone conduction function of the sensor device to the sensor device in response to the reception of the third signal.

According to various example embodiments, based on the bone conduction-related data having not been transmitted to the audio module during a specified time or more, the at least one processor may be configured to output a fourth signal for deactivation of the bone conduction function of the sensor device to the sensor device.

According to various example embodiments, based on execution of an application related to an utterance characteristic being terminated, the at least one processor may be configured to output a fourth signal for deactivation of a bone conduction function of the sensor device to the sensor device.

According to various example embodiments, the audio module may be configured to obtain an utterance characteristic through tuning using the obtained bone conduction-related data and audio data received from a microphone.

According to various example embodiments, the sensor device may be a 6-axis sensor.

Figure 7:
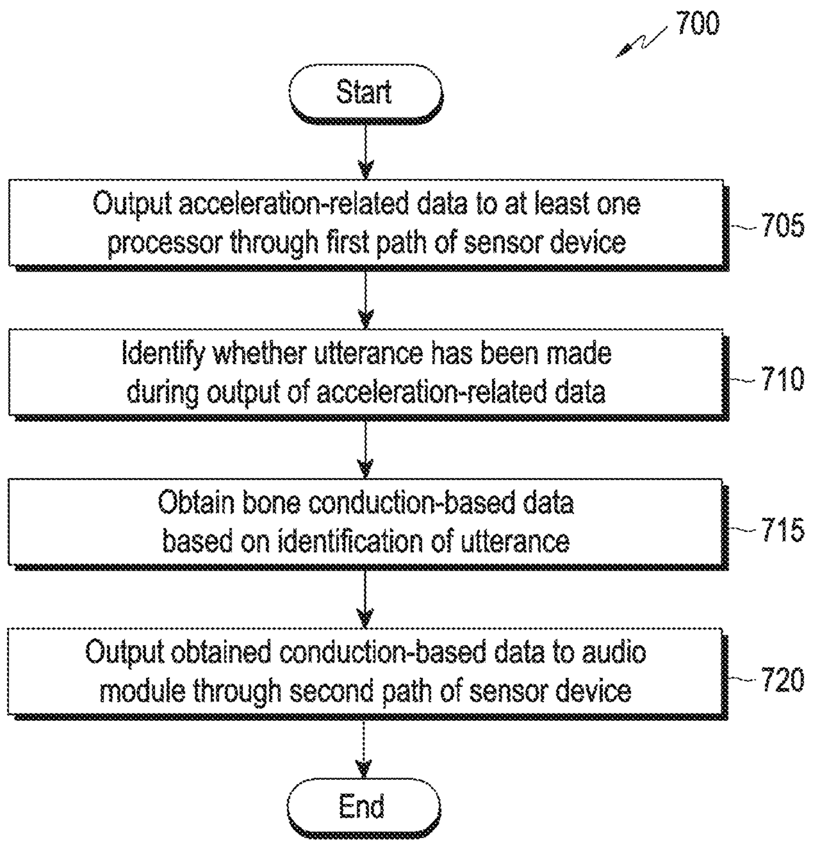
FIG. 7 is a flowchart illustrating an example operation of a wearable device according to various embodiments.

FIG. 7 is a flowchart 700 illustrating an example operation of a wearable device according to various embodiments. Referring to FIG. 7, the operation may include operations 705, 71, 715 and 720. Each step/operation of the operation method of FIG. 7 may be performed by an electronic device (e.g., the wearable device 200 of FIG. 5) and the sensor device 610 (e.g., an integrated inertia sensor) of the wearable device. In an embodiment, at least one of operations 705 to 720 may be omitted, some of operations 705 to 720 may be performed in a different order, or other operations may be added.

According to various embodiments, the wearable device 200 (e.g., the sensor device 610) may output acceleration-related data to at least one processor (e.g., the processor 620 of FIGS. 6A and 6*b*) through a first path (e.g., the first path 640 of FIGS. 6A and 6B) of the sensor device 610 in operation 705.

In operation 710, the wearable device 200 (e.g., the sensor device 610) may identify whether the user has made an utterance during the output of the acceleration-related data. According to an embodiment, the sensor device 610 may detect the utterance using the VAD function. For example, when a change in the characteristics of an electrical signal generated by the acceleration sensor and/or the gyro sensor is equal to or greater than a threshold, the sensor device 610 may detect the utterance, considering the electrical signal to be a signal corresponding to voice.

In operation 715, the wearable device 200 (e.g., the sensor device 610) may obtain bone conduction-related data based on the identification of the utterance. According to various embodiments, the wearable device 200 may obtain the bone conduction-related data using the sensor device 610.

According to various embodiments, the wearable device 200 may obtain the acceleration-related data at a first sampling rate and the bone conduction-related data at a second sampling rate. For example, when the sensor device 610 obtains data sampled at the first sampling rate, the sampled data may be the acceleration-related data. In addition, when the sensor device 610 obtains data sampled at the second sampling rate different from the first sampling rate, the sampled data may be the bone conduction-related data.

According to various embodiments, the operation of obtaining the bone conduction-related data using the sensor device 610 may include receiving a first signal for activating a bone conduction function from the processor 620, and obtaining the bone conduction-related data in response to the reception of the first signal.

According to various embodiments, the method may further include outputting a second signal related to the identification of the utterance to the audio module 630 based on the identification of the utterance by the sensor device 610.

According to various embodiments, the method may further include receiving a third signal requesting activation of the bone conduction function from the audio module 630 in response to the output of the second signal related to the identification of the utterance to the audio module 630, and outputting the first signal for activating the bone conduction function of the sensor device 610 in response to the reception of the third signal, by the processor 620 of the electronic device (e.g., the wearable device 200).

For example, the second signal transmitted to the audio module 630 by the sensor device 610 may be an interrupt signal. The audio module 630 may transmit the third signal requesting activation of the bone conduction function of the sensor device 610 to the processor 620 in response to the interrupt signal, and the processor 620 may activate the bone conduction function of the sensor device 610 in response to the request.

Although the audio module 630 may activate the bone conduction function of the sensor device 610 under the control of the processor 620 in response to the interrupt signal from the sensor device 610 as described above, in another example, the audio module 630 may transmit a clock control signal for outputting a signal from a specific output terminal of the sensor device 610 at a specific sampling rate in response to the reception of the interrupt signal, to activate the bone conduction function of the sensor device 610.

In operation 720, the wearable device 200 may output the obtained bone conduction-related data to the audio module 630 through a second path (e.g., the second path 650 of FIGS. 6A and 6B) of the sensor device 610.

According to various embodiments, the operation of outputting the acceleration-related data to the processor 620 of the electronic device through the first path may include outputting the acceleration-related data to the processor 620 of the electronic device through the first path based on at least one of the I2C, SPI, or I3C protocols, and the operation of outputting the bone conduction-related data to the audio module 630 of the electronic device through the second path of the sensor device 610 may include outputting the bone conduction-related data based on TDM scheme through the second path. For example, since the acceleration-related data sampled at the first sampling rate may always be output to the processor 620 through the first path, the processor 620 may always collect and process the acceleration-related data from the sensor device 610 regardless of whether the sensor device 610 collects the bone conduction-related data. According to various embodiments, because the sensor device 610 may collect the acceleration-related data simultaneously with collection of the bone conduction-related data, two sensor functions may be supported using one sensor.

According to various embodiments, the method may further include outputting a fourth signal for deactivating the bone conduction function of the sensor device 610 to the sensor device 610 by the processor 620 of the electronic device, when the bone conduction-related data has not been transmitted to the audio module 630 during a predetermined time or more.

According to various embodiments, the method may further include outputting the fourth signal for deactivating the bone conduction function of the sensor device 610 to the sensor device 610 by the processor 620 of the electronic device, when execution of an application related to utterance characteristics is terminated.

According to various embodiments, the method may further include obtaining the utterance characteristics through tuning using the obtained bone conduction-related data and audio data input from the microphone using the audio module 630.

Figure 8:
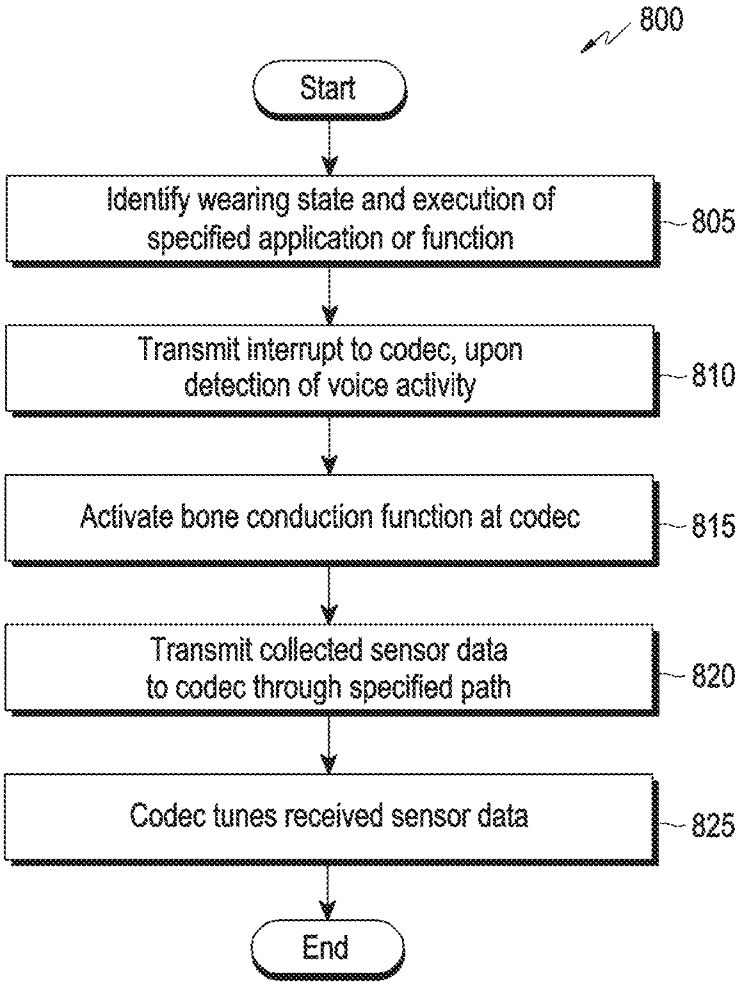
FIG. 8 is a flowchart illustrating an example operation of a wearable device according to various embodiments.

FIG. 8 is a flowchart 800 illustrating an example operation of a wearable device according to various embodiments.

In operation 805, the wearable device 200 may identify whether the wearable device 200 is worn and/or a specified application or function is executed. Whether the wearable device 200 is worn or a specified application or function is executed may correspond to a condition for determining whether bone conduction-related data is required to improve audio performance. For example, the wearable device 200 may identify whether the wearable device 200 is worn using a wear detection sensor. For example, the wear detection sensor may be, but not limited to, a proximity sensor, a motion sensor, a grip sensor, a 6-axis sensor, or a 9-axis sensor.

In addition, the wearable device 200 may identify, for example, whether an application or function requiring increased audio performance is executed. For example, when a call application is executed, bone conduction-related data is required to cancel noise, and even when a voice assistant function is used, the bone conduction-related data may also be required to increase voice recognition performance.

Accordingly, the wearable device 200 may identify whether a specified application (e.g., a call application) is executed or a call is terminated or originated, while the wearable device 200 is worn on the user's body. For example, when the user presses a specific button of the electronic device 101 interworking with the wearable device 200 to use the voice assistant function, the wearable device 200 may use sensor data of the sensor device 610 to determine whether an utterance has started.

In operation 810, when detecting a voice activity, the wearable device 200 may transmit an interrupt (or interrupt signal) to a codec (e.g., the audio module 630). In this case, the wearable device 200 may identify whether the user has made an utterance in a pseudo manner. For example, when the user speaks, characteristics (e.g., a pattern (e.g., a value change on a time basis) of an electrical signal generated from the acceleration MEMS 614 and/or gyro MEMS 616 in the sensor device 610 may be changed. For example, according to an utterance of the user wearing the wearable device 200, a signal of a waveform in which an acceleration value is significantly increased with respect to a specific axis among the x, y, and z axes may be generated. Accordingly, when a signal characteristic equal to or greater than a threshold is detected using VAD function, the sensor device

610 of the wearable device 200 may identify the start of the utterance based on a change in the pattern of the electrical signal. Besides, the sensor device 610 may detect a pattern according to whether the magnitude of a characteristic of an electrical signal generated from the acceleration MEMS 614 and/or the gyro MEMS 616 satisfies the threshold value (e.g., a peak value) or more, a detection duration, and dispersion, and identify whether the user has actually made an utterance based on the pattern.

As such, when a voice activity is detected using the VAD function, fast utterance detection is important. Therefore, the sensor device 610 may identify a signal characteristic within a short time and then transmit an interrupt signal to the codec through an interface with the codec (e.g., the audio module 630). The interrupt signal may include information related to the identification of the utterance.

In operation 815, the bone conduction function may be activated in the codec (e.g., the audio module 630) of the wearable device 200. According to various embodiments, to activate the bone conduction function, the codec (e.g., the audio module 630) may transmit a signal requesting activation of the bone conduction function of the sensor device 610 to the processor 620 in response to the interrupt signal. In response to the signal requesting activation of the bone conduction function, the processor 620 may transmit a signal for activating the bone conduction function of the sensor device 610 through an interface (e.g., the first path 640 of FIGS. 6A and 6B) with the sensor device 610.

As state information has been stored in a memory or register storing internal setting values of the sensor device 610, the sensor device 610 may simultaneously perform the function of the acceleration sensor and the bone conduction function.

According to various embodiments, when the bone conduction function of the sensor device 610 is activated by the processor 620, the codec (e.g., the audio module 630) may transmit a clock control signal for controlling output of a signal from a specific output terminal of the sensor device 610 at a specific sampling rate, to the sensor device 610 through a specific path (e.g., the second path 650 of FIGS. 6A and 6B) leading to the sensor device 610. Accordingly, the sensor device 610 may collect sensor data obtained by sampling a signal received using the 6-axis sensor (e.g., an acceleration sensor) at a higher sampling rate, when bone conduction-related data is required. For example, compared to the acceleration-related data, the bone conduction-related data has a different sampling rate and the same characteristics. Therefore, the sensor device 610 may collect the bone conduction-related data based on the acceleration sensor function between the acceleration sensor function and the gyro sensor function. The sensor data may be bone conduction-related data digitized through the A/D converter. For example, a signal received through the acceleration sensor is obtained as data at a sampling rate of 833 Hz, while when the bone conduction function is activated, the bone conduction-related data may be obtained at a sampling rate of 16 kHz.

In operation 820, the sensor data collected during activation of the bone conduction function in the sensor device 610 may be transmitted to the codec through a specified path between the sensor device 610 and the codec. According to an embodiment, a TDM-based interface is taken as an example of the specified path between the sensor device 610 and the codec, which should not be construed as limiting. For example, as far as a large amount of data are transmitted within the same time through a path specified from the sensor device 610 to the audio module 630, any data transmission scheme is available.

In operation 825, the codec of the wearable device 200 may tune the received sensor data. As such, during the activation of the bone conduction function, the bone conduction-related data may be continuously transmitted to the codec, and the acceleration-related data may always be transmitted to the processor 620 through an interface with the processor 620, during the transmission of the bone conduction-related data to the codec.

When the bone conduction function is inactive, the bone conduction-related data may no longer be transmitted to the codec. For example, when the bone conduction-related data has not been transmitted to the codec during a predetermined time or more, the processor 620 may deactivate the bone conduction function by transmitting a signal for deactivating the bone conduction function of the sensor device 610. In addition, when a running application or function is terminated, for example, even when the execution of an application (e.g., a call application or a voice assistant function) related to utterance characteristics is terminated, the processor 620 may deactivate the bone conduction function of the sensor device 610. For example, the bone conduction function may be deactivated by discontinuing transmission of a clock control signal from the codec through a specified path, for example, a TDM interface.

Figure 9:
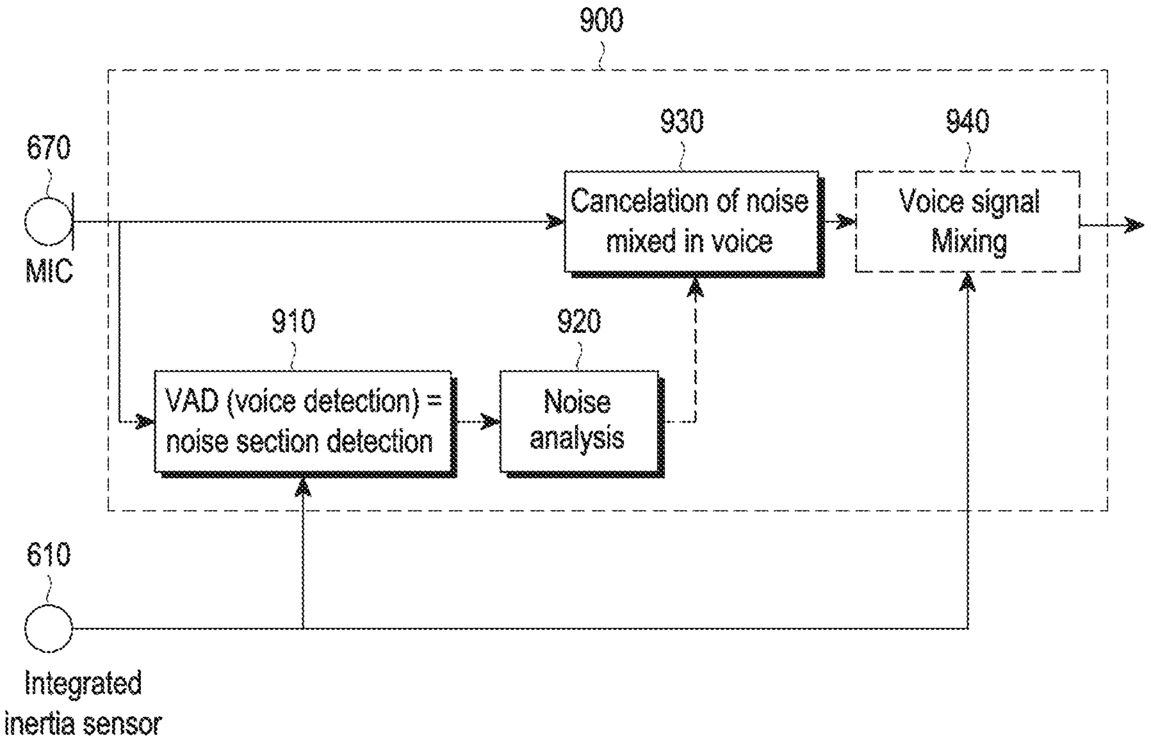
FIG. 9 is a diagram illustrating an example noise canceling operation according to various embodiments.

FIG. 9 is a diagram illustrating an example noise canceling operation according to various embodiments.

FIG. 9 illustrates an example call noise cancellation solution 900 using data from an integrated inertia sensor. According to various embodiments, when a call application is executed, the wearable device 200 (e.g., the audio module 630) may detect the start of an utterance through VAD 910, thereby detecting a user's voice during a call. In this case, since the microphone 670 receives a signal in which a user voice during the call is mixed with noise generated in a process of receiving an external sound signal (or external audio data), various noise cancellation algorithms for canceling noise may be implemented.

For example, sensor data of the sensor device 610 may be used to cancel noise. For example, during an utterance, the sensor device 610 (e.g., an integrated inertia sensor) may obtain sensor data when the user wearing the wearable device 200 speaks. The sensor data may be used to identify whether the user has actually made an utterance. For example, when the user speaks while wearing the wearable device 200, the wearable device 200 moves and thus the value of data related to an acceleration is changed. To identify whether the user has actually made an utterance based on this change, the sensor data of the sensor device 610 may be used.

However, even though the user does not actually speak, sensor data that changes to or above the threshold may be output due to food intake or the like, or sensor data may change due to various external shocks or fine tremors. Therefore, the sensor data may be used together with external audio data collected through the microphone 670 to identify whether the user has made an utterance. For example, when an utterance time estimated based on the external audio data received through the microphone 670 matches an utterance time estimated based on the sensor data, the wearable device 200 (e.g., the audio module 630) may identify that user has actually made an utterance. When the start of the utterance is detected in this manner, the wearable device 200 (e.g., the audio module 630) may control the sensor device 610 to activate the bone conduction function.

Further, the sensor data may be used to detect a noise section in the audio module 630. The audio module 630 may analyze noise (920) to cancel noise mixed in the user's voice during a call from the microphone 670 (930). Upon receipt of sensor data, e.g., bone conduction-related data from the sensor device 610, the audio module 630 may detect utterance characteristics through mixing (940) between the noise-removed voice signal and the bone conduction-related data. For example, voice and noise may be separated from an original sound source based on timing information about the utterance or utterance characteristics transmitted in the bone conduction-related data, and only voice data may be transmitted to the processor 620 during the call. For example, when the voice assistant function of the electronic device 101 interworking with the wearable device 200 is used, a context recognition rate based on an utterance may be increased. Further, for example, the voice data may also be used for user authentication. According to various embodiments, because the sound quality of the voice recognition function may be improved through the integrated inertia sensor, the voice data may be used to identify whether the user is an actual registered user or to identify an authorized user based on pre-registered unique utterance characteristics of each user. The noise-removed voice data may be variously used according to an application (or a function) being executed in the wearable device 200 or the electronic device 101 connected to the wearable device 200.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the 'non-transitory' storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing configured to be mounted on or detached from an ear of a user;

at least one processor disposed within the housing;

an audio module comprising audio circuitry; and a sensor device including at least one sensor operatively coupled to the at least one processor and the audio module, wherein the sensor device is configured to:

obtain acceleration-related data at a first sampling rate, output the acceleration-related data to the at least one processor through a first path of the sensor device, identify whether an utterance has been made during the output of the acceleration-related data, obtain bone conduction-related data at a second sampling rate based on the identification of the utterance, and output the obtained bone conduction-related data to the audio module through a second path of the sensor device.

2. The electronic device of claim 1, wherein the sensor device is configured to output the acceleration-related data to the at least one processor through the first path based on at least one of I2C, serial peripheral interface (SPI), or I3C protocols, and wherein the sensor device is configured to output the obtained bone conduction-related data based on time division multiplexing (TDM) scheme to the audio module through the second path.

3. The electronic device of claim 1, wherein the sensor device is configured to: convert the bone conduction-related data obtained at the second sampling rate through an analog-to-digital (A/D) converter, and output the converted bone conduction-related data to the audio module through the second path.

4. The electronic device of claim 1, wherein the sensor device is configured to:

receive a first signal for activating a bone conduction function from the at least one processor based on the identification of the utterance, and obtain the bone conduction-related data in response to receiving the first signal.

5. The electronic device of claim 4, wherein the sensor device is configured to output a second signal related to the identification of the utterance to the audio module based on the identification of the utterance.

6. The electronic device of claim 5, wherein the at least one processor is configured to:

receive a third signal requesting activation of the bone conduction function of the sensor device from the audio module in response to the output of the second signal related to the identification of the utterance to the audio module, and output the first signal for activation of the bone conduction function of the sensor device to the sensor device in response to receiving the third signal.

7. The electronic device of claim 1, wherein based on the bone conduction-related data not having been transmitted to the audio module during a specified time or more, the at least one processor is configured to output a fourth signal for deactivation of the bone conduction function of the sensor device to the sensor device.

8. The electronic device of claim 1, wherein based on execution of an application related to an utterance characteristic being terminated, the at least one processor is configured to output a fourth signal for deactivation of a bone conduction function of the sensor device to the sensor device.

9. The electronic device of claim 1, wherein the audio module is configured to obtain an utterance characteristic through tuning using the obtained bone conduction-related data and audio data received from a microphone.

10. The electronic device of claim 1, wherein the sensor device comprises a 6-axis sensor.

11. A method of operating an electronic device, the method comprising:

obtaining acceleration-related data at a first sampling rate using a sensor device of the electronic device;

outputting the acceleration-related data to a processor of the electronic device through a first path of a sensor device of the electronic device;

identifying whether an utterance has been made during the output of the acceleration-related data using the sensor device;

obtaining bone conduction-related data at a second sampling rate based on the identification of the utterance using the sensor device; and outputting the obtained bone conduction-related data to an audio module of the electronic device through a second path of the sensor device.

12. The method of claim 11, wherein the outputting of acceleration-related data to a processor of the electronic device through a first path of a sensor device comprises outputting the acceleration-related data to the processor of the electronic device through the first path based on at least one of I2C, serial peripheral interface (SPI), or I3C protocols, and wherein the outputting of the obtained bone conduction-related data to an audio module of the electronic device through a second path of the sensor device comprises outputting the obtained bone conduction-related data based on time division multiplexing (TDM) scheme through the second path.

13. The method of 11, wherein the obtaining of bone conduction-related data using the sensor device comprises:

receiving a first signal for activating a bone conduction function from the processor; and obtaining the bone conduction-related data in response to receiving the first signal.

14. The method of claim 13, further comprising outputting a second signal related to the identification of the utterance to the audio module based on the identification of the utterance by the sensor device.

15. The method of claim 14, further comprising:

receiving a third signal requesting activation of the bone conduction function of the sensor device from the audio module in response to the output of the second signal related to the identification of the utterance to the audio module by the processor of the electronic device; and outputting the first signal for activation of the bone conduction function of the sensor device to the sensor device in response to receiving the third signal by the processor of the electronic device.

16. The method of claim 11, further comprising, based on the bone conduction-related data not having been transmitted to the audio module during a specified time or more, outputting a fourth signal for deactivation of the bone conduction function of the sensor device to the sensor device by the processor of the electronic device.

17. The method of claim 11, further comprising, based on execution of an application related to an utterance characteristic being terminated, outputting a fourth signal for deactivation of a bone conduction function of the sensor device to the sensor device by the processor of the electronic device.

18. The method of claim 11, further comprising obtaining an utterance characteristic through tuning using the obtained bone conduction-related data and audio data received from a microphone using the audio module.

* * * * *